(12) United States Patent
Fraizer et al.

(10) Patent No.: US 12,180,411 B2
(45) Date of Patent: Dec. 31, 2024

(54) THERMALLY CONDUCTIVE COMPONENT WITH A BULK MOLDED COMPOUND AND NO BASE COAT

(71) Applicant: Valeo Vision, Bobigny (FR)

(72) Inventors: Robert Fraizer, Auburn Hills, MI (US); Colby Darlage, Troy, MI (US); Scott Adaska, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/307,876

(22) Filed: Apr. 27, 2023

(65) Prior Publication Data

US 2024/0360351 A1 Oct. 31, 2024

(51) Int. Cl.
| | |
|---|---|
| *C09K 5/14* | (2006.01) |
| *C08K 3/013* | (2018.01) |
| *C08K 3/34* | (2006.01) |
| *C08K 7/14* | (2006.01) |
| *C08K 13/04* | (2006.01) |
| *F21V 29/508* | (2015.01) |
| *F21V 29/70* | (2015.01) |

(52) U.S. Cl.
CPC ............... *C09K 5/14* (2013.01); *C08K 13/04* (2013.01); *F21V 29/508* (2015.01); *F21V 29/70* (2015.01); *C08K 3/013* (2018.01); *C08K 2003/343* (2013.01); *C08K 7/14* (2013.01); *C08K 2201/001* (2013.01)

(58) Field of Classification Search
CPC .. F21V 29/508; F21V 29/70; F21V 2003/343; F21V 2201/001; C09K 5/14; C08K 13/04; C08K 3/013; C08K 7/14
See application file for complete search history.

(56) References Cited

U.S. PATENT DOCUMENTS

| | | | |
|---|---|---|---|
| 4,482,209 A | 11/1984 | Grewal et al. | |
| 4,490,228 A | 12/1984 | Bodin et al. | |
| 5,527,562 A | 6/1996 | Balaba et al. | |
| 5,828,493 A | 10/1998 | Bischer, Jr. et al. | |
| 5,865,530 A | 2/1999 | Weber | |
| 6,392,350 B1 | 5/2002 | Amano | |
| 6,520,650 B2 | 2/2003 | Fraizer | |
| 6,627,307 B1 | 9/2003 | Reichert et al. | |

(Continued)

FOREIGN PATENT DOCUMENTS

| | | | | |
|---|---|---|---|---|
| CN | 104204869 A | * | 12/2014 | ............. C08K 3/013 |
| FR | 3093161 A1 | * | 8/2020 | ............. F21S 41/657 |
| WO | 2009/115512 A1 | | 9/2009 | |

OTHER PUBLICATIONS

Fr 3093161, Rodolphe Peron, Aug. 28, 2020, English Translation (Year: 2020).*

(Continued)

*Primary Examiner* — Peggy A Neils
(74) *Attorney, Agent, or Firm* — Young Basile Hanlon & MacFarlane, P.C.

(57) ABSTRACT

A body composition comprising: a bulk molded compound (BMC) comprising: one or more thermoset resins; one or more fillers; one or more reinforcements; and one or more binders; a thermally conductive material disposed within the bulk molded compound so that then the body composition as molded into a body the body assists is removing thermal energy.

20 Claims, 3 Drawing Sheets

(56) References Cited

U.S. PATENT DOCUMENTS

| | | | | |
|---|---|---|---|---|
| 6,827,470 | B2 * | 12/2004 | Sagal | ............ F21S 45/48 362/255 |
| 7,742,225 | B2 | 6/2010 | Wu et al. | |
| 7,830,075 | B2 | 11/2010 | Wu | |
| 11,365,336 | B2 | 6/2022 | Bougher et al. | |
| 2003/0203107 | A1 | 10/2003 | Cote et al. | |
| 2004/0085772 | A1 | 5/2004 | Daichou et al. | |
| 2006/0067623 | A1 | 3/2006 | Viard et al. | |
| 2006/0139744 | A1 | 6/2006 | Mehrtens et al. | |
| 2006/0240281 | A1 | 10/2006 | Liao et al. | |
| 2008/0122012 | A1 | 5/2008 | Fukuhara | |
| 2008/0289957 | A1 | 11/2008 | Takigawa et al. | |
| 2009/0207879 | A1 | 8/2009 | Kurashina | |

OTHER PUBLICATIONS

CN 104204869, Takuji Schimizu, Dec. 10, 2014, English Translation (Year: 2014).*
International Search Report and Written Opinion for Application No. PCT/US2024/024960, dated Aug. 27, 2024, 9 pgs.

* cited by examiner

THERMALLY CONDUCTIVE COMPONENT WITH A BULK MOLDED COMPOUND AND NO BASE COAT

FIELD

The present teachings relate to a component that comprises a bulk molded compound and no base coat where the component is thermally conductive to remove heat from one or more adjacent components.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. These lights may generate heat such that as the lights heat up, the materials of the light may thermally expand or thermally contract as temperatures of the materials change over time.

Thus, there is a need for a lighting component that is thermally stable over time as heat is generated by the lights, a heat producing component, a printed circuit board, a component on the printed circuit board, a microprocessor, or a combination thereof. There is a need for a material that removes heat, distributes heat, transvers heat over a surface area, or a combination thereof so that expansion and contraction are prevented as thermal changes are introduced into the system. There is a need for a system where a base of the system is made from a bulk molded compound and the bulk molded compound is free of a base coat. It would be desirable to have a bulk molded compound that that may be rapidly produced relative to conventional bulk molded compounds.

SUMMARY

The present teachings provide: a body composition comprising: a bulk molded compound (BMC) comprising: one or more thermoset resins; one or more fillers; one or more reinforcements; and one or more binders; a thermally conductive material disposed within the bulk molded compound so that then the body composition as molded into a body the body assists is removing thermal energy.

The present teachings provide: a lighting component comprising: a body comprising: a body composition comprising: a bulk molded compound (BCM); a thermally conductive material in the bulk molded compound; a coating located directly on the body so that the coating connects directly to the body; a heat producing component in communication with the body, wherein heat from the heat producing component is absorbed into the body and some or all of the heat is dissipated by the body.

The present teachings provide: a process comprising: forming a bulk molded compound (BMC) comprising: one or more thermoset resins; one or more fillers; one or more reinforcements; and one or more binders; combining the bulk molded compound with a thermally conductive material to form a body composition; molding the body composition into a body of a lighting component; applying a coating directly over the body; and connecting a heat producing component to the body; and wherein a cycle time of molding the body composition into a body is reduced by between about 10 second and two minutes relative to a BMC that is free of the thermally conductive material.

The present teachings provide a lighting component that is thermally stable over time as heat is generated by the lights, a heat producing component, a printed circuit board or component thereon, or a combination thereof. The present teachings provide a material that removes heat, distributes heat, transvers heat over a surface area, or a combination thereof so that expansion and contraction are prevented as thermal changes are introduced into the system. The present teachings provide a system where a base of the system is made from a bulk molded compound and the bulk molded compound is free of a base coat. The present teachings provide a bulk molded compound that that may be rapidly produced relative to conventional bulk molded compounds.

DETAILED DESCRIPTION

Figure 1:
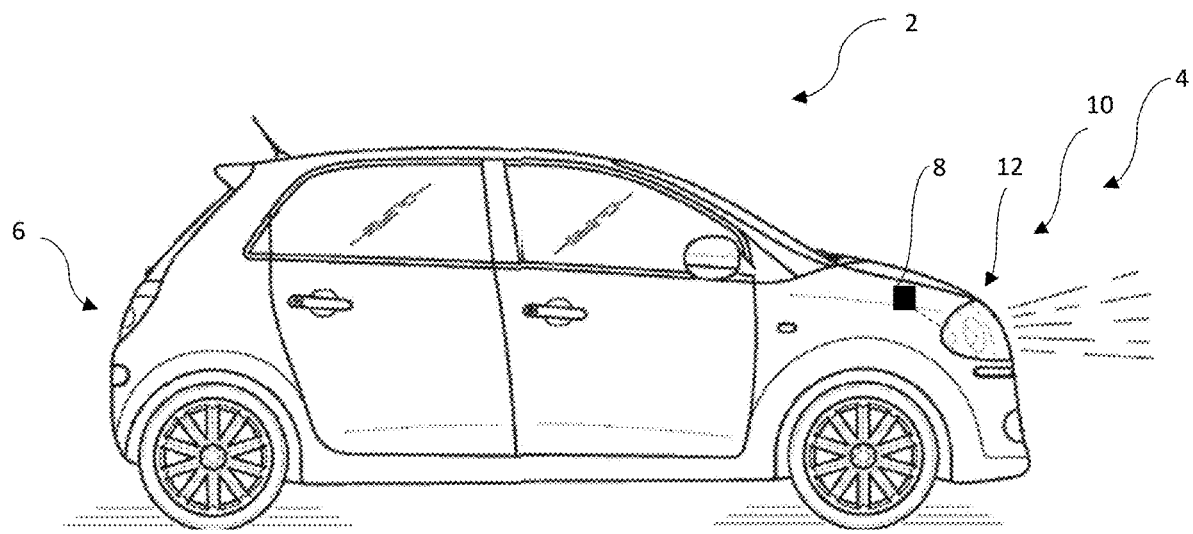
FIG. 1 is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle.

The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light system may include multiple different lights or light sub-systems that each provide a different function. The light systems may be multiple light systems or light sources stacked one above the other, side by side, within different planes, within a same plane and projecting in different direction, integrated into a single light system, or a combination thereof. The light system may have multiple smaller light systems or light sources. The light systems may include a body and the body may be covered by one or more outer lenses or may be free of an outer lens.

The outer lens may form an outer most surface of the light system. The outer lens may function to protect all or a portion of the light system. The outer lens may be free of covering a lighting component. The outer lens may cover the lights.

The plurality of light systems or lights may be located in one light system or one component. The plurality of light systems may operate independently of one another such that one light system may not affect another light system or portion of the light system. The light system may provide light with two or more colors, three or more colors, four or more colors, or a combination thereof. The light system may provide signals, symbols, words, images, patterns, ornamentation, decoration, or a combination thereof.

The light sources function to produce light, direct light into a substrate, or both. The light source may be a device or a plurality of devices that create light and the light extends outward from the light source. The light source may produce a high beam, a low beam, a blending beam, a running light, a daytime light, a turn signal, a brake light, a warning light, a communication, ornamentation, a signal, decoration, or a combination thereof. The light sources may have different functions. For example, one light source may provide a running light, another light source may be a turn signal, and another light source may provide a signal, communication, decoration, or ornamentation. The light source may comprise a plurality of lights or may be a single light source within a set of light sources. The plurality of lights may be in one set or group of light sources. The light source may be a single light that projects light. In another example, a light source may direct light in a first direction. The light sources may direct light in a first direction. The substrate may direct light from the light sources in a second direction.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, or 11 or more lights that produce light and combine together to form the light extending from the light system. The sets of light sources may include 20 or less, 18 or less, 16 or less, or 14 or less lights that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 lights.

The number of light sources in a part of the light system may dependent upon a size of the region or a size illuminated. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements, textured portions, micro-optics, or reflectors (e.g., a substrate or a portion of a substrate). Each device (e.g., light or LED) of the light source may be turned on and off. The light sources may be illuminated in a sequence. The light source may be located within a light system at a location relative to a substrate, an edge of a substrate, a side of a substrate, or a combination thereof. The light sources may work together as a set of light sources to create light. All of the light sources may be a same color or provide a same color light. For example, all of the lights may be white or non-colored light. All of the light sources may be a single color light source.

The set of light sources function to fill a light bar, a lens, an outer housing, an outer lens, light blade, a substrate, an edge of a substrate, a side of a substrate, or a combination thereof so that light projected outward to perform some function. The set of light sources may be a single function (e.g., a high beam, a low beam, a blending beam, a running light, a daytime light, a turn signal, a brake light, ornamentation, a display, signaling, or a combination thereof). Each set of light sources may perform a single function. The light sources may extend in a row, in a column, a straight line, or a combination of both. All of the lights within a set of light sources may provide the same light (e.g., color, color temperature, or wavelength). The color, intensity, temperature, or a combination thereof within one light source may all be identical. The light from the light system may be directed to a predetermined location depending on a function of the light from that set of light sources. The light from the light sources may be directed outward from a vehicle so that the light is visible external of the vehicle. The light sources may be controlled my one or more controllers.

The controllers function to control the light sources or the lights within a light source individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, or a combination thereof. The controller may be programmable, include pre-set programs, or both. The controller may be accessed inside of the vehicle so that the user can change the illumination settings of the light system. The controller may communicate with light sources through one or more printed circuit boards.

The light sources (and lights) may be located on or connected to one or more printed circuit boards. The printed circuit boards (PCB) may provide power, signals, support, or a combination thereof to one or more light sources. The PCB may be fixed within a light system. Each PCB may be connected to a plurality of light sources. The PCB may be electrically connected, mechanically connected, or both to one or more light sources discussed herein. The PCBs may aim the light from the light sources. The PCBs may align a light source with a light guide. The PCBs may be connected to a body of the light system.

The body of the light system functions to connect the light system within a vehicle. The body include one or more light sources, two or more light sources, three or more light sources, or a plurality of light sources. The body may direct light in a predetermined direction, redirect light in a predetermined direction, or both. The body may aim the lights within the light system, the vehicle, or both. The body may be a central portion that all of the components connect to so that the light system when connected to a vehicle the light system functions. The body may be directly connected to a printed circuit board, a controller, a micro-processor, or a combination thereof. The body may be thermally connected to a printed circuit board, a controller, components on the printed circuit board, or a combination thereof. The printed circuit board, the controller, the light sources, or a combination thereof may be connected to the body.

The body may reflect light, aim light, and dissipate heat. The body may include a reflector portion, a heat sink portion, a heat dissipation portion, or a combination thereof. The body may have a body composition that may be made of or include a first composition of materials and the body composition may be covered one or more coatings. The body composition may be sufficiently rigid to support the light system within a vehicle. The body composition may sufficiently thermally conductive to dissipate heat to prevent thermal movement of the light system (e.g., movement from thermally expanding or thermally contracting). The body composition may be or include one or more components that when combined together form the body.

The body composition may include one or more bulk molded compounds (hereinafter BMC). The body composition may be comprised substantially of BMC. The body composition may be composed of about 40 percent or more, about 50 percent or more, about 60 percent or more, about 70 percent or more, about 80 percent or more, about 90 percent or more, or about 95 percent or more BMC of the total weight of the BMC composition. The body composition may be composed of about 99 percent or less, about 98 or less, 97 percent or less, 95 percent or less, about 93 percent or less, or about 90 percent or less of the total weight of the BMC composition. The BMC may include glass fibers, styrene, an initiator, a filler, a thermoset resin, calcium carbonate ($CaCO_3$), crushed glass, binder, polyester, polymethyl methacrylate (PMMA), talcum powder, magnesium silicide ($Mg_2Si$), thermoset resin, unsaturated resin, release agent, catalyst, filler, reinforcement, thermoplastic resin, pigment, thickening agents, flash reducer, or a combination thereof.

The thermoset resin may be or include polyester, an unsaturated polyester, vinyl ester, epoxy, phenolic, or a combination thereof. The thermoset may react when cured to solidify the BMC. The thermoset resin may about 3 percent or more, about 5 percent or more, about 7 percent or more, about 10 percent or more, or about 12 percent or more of the total weight of the BMC composition (e.g., around 7 percent by weight). The thermoset may be about 30 percent or less, about 25 percent or less, about 20 percent or less, about 15 percent or less, about 13 percent or less, or about 35 percent or less of the total weight of the BMC composition. The thermoset resin may be combined with filler, reinforcement, thermoplastic resin, or a combination thereof.

The filler functions to enhance thermal conductivity of the BMC. The filler may have a high surface area that fills voids between thermoset resin, reinforcement, thermoplastic resin, or a combination thereof. The filler may be calcium carbonate, talcum powder, barium sulfate, sodium sulfate, magnesium silicate, mica, kaolin, calcium silicate, or a combination thereof. The filler may be inert. The filler may be a mixture of fillers listed herein. The filler may be one of the fillers listed herein. The filler may be present in an amount of about 15 percent or more, about 25 percent or more, about 35 percent or more, about 45 percent or more, or about 55 percent or more by weight of the total weight of the BMC composition. The filler may be present in an amount of about 80 percent or less, 75 percent or less, about 70 percent or less, or about 68 percent or less by weight of the total weight of the BMC composition. The filler may have a medium particle size of about 1 µm or more, about 3 µm or more, about 5 µm or more, or about 8 µm or more. The filler may have a medium particle size of about 20 µm or less, about 15 µm or less, about 12 µm or less, or about 10 µm or less. The filler may have a surface area of about 0.2 $m^2/g$ or more, about 0.4 $m^2/g$ or more, about 0.6 $m^2/g$ or more, or about 0.8 $m^2/g$ or more. The filler may have a surface area of about 3.0 $m^2/g$ or less, about 2.0 $m^2/g$ or less, about 1.8 $m^2/g$ or less, about 1.5 $m^2/g$ or less, or about 1.2 $m^2/g$ or less. The filler may be mixed with a reinforcement material, a mold release, a catalyst, or a combination thereof as part of the BMC composition.

The mold release agent may function to prevent shrinkage of the BMC composition, the body, or both. The mold release agent may prevent the BMC composition, the body, or both from sticking to a mold. The mold release agent may be or include zinc, calcium, antimony, wax, fatty ester, silicone, metallic soap, graphite, vegetable oil, mineral oil, or a combination thereof. The mold release agent may be present in an amount of about 0.2 percent or more, about 0.4 percent or more, about 0.6 percent or more, or about 0.8 percent or more by weight of the total weight of the BMC composition. The mold release agent may be present in an amount of about 5 percent or less, about 3 percent or less, about 2 percent or less, or about 1 percent or less by weight of the total weight of the BMC composition. The mold release agent may be zinc antimony or calcium antimony. The BMC composition may include a mold release agent and a catalyst.

The catalyst functions to start a reaction, drive a reaction, or both. The catalyst may vary depending on the resin being used (e.g., thermoplastic resin or thermoset resin). The catalyst may be or include ketone, cobalt, peroxyester, a methyl ethyl ketone peroxide (MEKP), vinyl ester, or a combination thereof. The catalyst may be present in an amount of about 0.2 percent or more, about 0.4 percent or more, about 0.6 percent or more, or about 0.8 percent or more by weight of the total weight of the BMC composition. The catalyst may be present in an amount of about 5 percent or less, about 3 percent or less, about 2 percent or less, or about 1 percent or less by weight of the total weight of the BMC composition.

The reinforcement may strengthen the thermoset resin, thermoplastic resin, filler, or a combination thereof. The reinforcement may intertwine with the thermoset resin, the thermoplastic resin, or both. The reinforcement may be fibers, strands, chopped fibers, a crushed material, or a combination thereof. The reinforcement may be a synthetic material, a natural material, glass, fiberglass, cellulose, carbon fiber, metal fibers, or a combination thereof. The reinforcement may be fibers, chopped fibers, crushed fibers, chopped glass fibers, crushed glass, or a combination thereof. When the reinforcement is a fiber the fiber may have a length of about 1 mm or more, about 3 mm or more, about 5 mm or more, or about 6 mm or more. The fiber may have a length of about 20 mm or less, about 15 mm or less, about 10 mm or less, about 8 mm or less, or about 7 mm or less. The reinforcement may be present in an amount of about 5 percent or more, about 7 percent or more, about 10 percent or more, about 11 percent or more, about 12 percent or more, or about 15 percent or more by weight of the total weight of the BMC composition. The reinforcement may be present in an amount of about 30 percent or less, about 25 percent or less, about 20 percent or less, about 18 percent or less, about 16 percent or less, about 14 percent or less, about 13 percent or less by weight of the total weight of the BMC composition. The reinforcement may be uniformly mixed within the composition. The reinforcement may be mixed with binder before the reinforcement is added into the composition.

The binder may function to connect all of the components of the BMC together. The binder may chemically or mechanically connect all of the components together. The binder may act as a glue. The binder may be a natural material, a synthetic material, ethylene vinyl acetate, styrene-butadiene, polyacrylamide, starch, rubber, polyester, or a combination thereof. The binder may be present in an amount of about 1 percent or more, about 2 percent or more, about 3 percent or more, about 4 percent or more, about 5 percent or more, or about 7 percent or more by weight of the total weight of the BMC composition. The binder may be present in an amount of about 20 percent or less, about 15 percent or less, about 10 percent or less, or about 8 percent or less by weight of the total weight of the BMC composition. The binder may be a thermoset resin. The binder may be added in addition to the thermoset resin discussed herein. The binder may be the thermoset resin discussed herein. The binder may be mixed with a thermoplastic resin.

The thermoplastic resin may prevent shrinkage. The thermoplastic resin may provide some flexibility in the BMC compound. The thermoplastic resin may assist in releasing compound from a mold. The thermoplastic resin may be present in an amount of about 1 percent or more, about 3 percent or more or about 5 percent or more by weight of the total weight of the BMC composition. The thermoplastic resin may be present in an amount of about 15 percent or less, about 10 percent or less, about 7 percent or less, or about 6 percent or less by weight of the total weight of the BMC composition. The thermoplastic resin may be a polycarbonate, acetal copolymer polyoxymethylene, acetal homopolymer polyoxymethylene, acrylic, acrylic-polymethyl methacrylate (PMMA), nylon, polyethylene, polypropylene, polystyrene, polyvinyl chloride (PVC), polytetrafluoroethylene, polyvinyl acetate, saturated polyesters, or a combination thereof. The thermoplastic resin may be a mixture of components herein. The thermoplastic resin may be PMMA. The composition may be a mixture of filler, reinforcement materials, thermal plastic resins, catalyst, release agents, unsaturated resin, or a combination thereof with thermally conductive components. The body composition may include BMC and thermally conductive material that are mixed together.

The thermally conductive material functions to remove heat from components of the light system. The thermally conductive material may dissipate heat from the light system. The thermally conductive material may be fibers, particles, nano-tubes, flakes, crystals, natural, synthetic, or a combination thereof. The thermally conductive material may be or include graphite, graphene, fullerene, copper, bronze, silver, gold, nickel, iron, steel, boron nitride, aluminum, or a combination thereof. The thermally conductive material may be present in an amount of about 1 percent or more, about 3 percent or more, about 5 percent or more, about 7 percent or more, about 10 percent or more, or about 15 percent or more of the total weight of the body composition. The thermally conductive material may be present in an amount of about 40 percent or less, about 30 percent or less, about 20 percent or less, about 10 percent or less, about 7 percent or less, about 5 percent or less, about 3 percent or less the total weight of the body composition. The thermally conductive material may be located in a location generally near an external surface of the body. For example, a higher concentration of thermally conductive material may be disposed at or near exterior surfaces so that the thermally conductive material assist in facilitating heat transfer. The thermally conductive material may be uniformly distributed throughout the body. The thermally conductive material may be randomly distributed throughout the body. The thermally conductive material may a homogeneous distribution so that thermal energy is distributed throughout the entire body.

The body composition may have a sufficient amount of thermally conductive material so that the thermal conductivity material may be about 0.5 W/mK or more, about 1.0 W/mK or more, about 1.5 W/mK or more, about 2 W/mK or more, about 3 W/mK or more, about 5 W/mK or more, about 10 W/mK or more, or about 15 W/mK or more. The body composition may include thermally conductive material so that the body composition my have a thermal conductive is about 50 W/mK of less, about 40 W/mK of less, about 30 W/mK of less, about 20 W/mK of less, about 15 W/mK of less, about 10 W/mK of less, or about 5 W/mK of less. The thermally conductive material may be uniformly distributed throughout the body, the body composition, or both.

The body, the body composition material, or both have a surface roughness. The surface roughness may be sufficiently smooth so that one or more coatings may be applied (e.g., directly) on the body, the body composition, or both. The surface roughness may be sufficiently smooth so that a basecoat is not needed to adhere a coating to the body, the body composition, or both. The surface roughness may be about 10 nm or more, about 20 nm or more, about 30 nm or more, about 40 nm or more, about 50 nm or more, or about 75 nm or more. The thermally conductive material may be coated. The surface roughness may be about 200 nm or less, about 150 nm or less, about 125 nm or less, about 100 nm or less, about 75 nm or less, or about 50 nm or less (e.g., between about 83 nm and about 96 nm and preferably about 50 nm and 25 nm).

The coating may be directly applied to the body, the body composition material, or both. The coating may be reflective, thermally conductive, or both. The coating may be applied directly on the body or the body composition without any intervening components or base coatings. The coating may be applied to the body, the body composition, or both without any basecoat. The coating may be directly applied to the body, the body composition, or both. The coating may interact directly with the thermally conductive materials so that heat may transfer into and out of the body, the body composition, or both.

The coating may be applied to the body, the body composition material, or both after the body composition is molded into a final shape. The coating may be applied directly to the final shape. The coating may be disposed on the final shape via any disposition technique. The coating may be disposed by spraying, electrostatic disposition, metallization, vacuum, vacuum metallization, spin coating, arc spraying, flame spraying, plating, electroless plating, or a combination thereof. The coating may be or include aluminum, chrome, silver, or a combination thereof. The coating may provide reflection, thermal conductivity, or both to the body, the body composition material, or both. The coating may be applied in regions where reflection is not needed. The coating may be applied in regions where temperature producing components may contact, be located, or both. The coating may be in contact with a microprocessor, a control unit, a printed circuit board, or both. The coating may contact or bond to the thermally conductive material within the body, the body composition material, or both. The coating may direct heat from one or more temperature producing components into the body so that the body acts as a heat sink.

The coating and the body may be in direct contact with a heat producing device. The heat producing device may be any device in a lighting system that generates heat. The heat producing devices may be a light, a light emitting diode, a printed circuit board, a component on the printed circuit board, a processor, a microprocessor, or a combination thereof.

The teachings herein create a lighting component that may be made by one of more steps taught herein. The lighting component may be virtually any part of the lighting system. The lighting component may be a reflector. The process may begin by forming an article of manufacture (e.g., a body). A base material may be mixed together. The base material may be a BMC. The BMC may be mixed with one more thermally conductive materials. The thermally conductive materials and the BMC form a body composition material. The body composition material may be formed into a body. The body composition material may be formed into a body by extrusion, pultruding, molding, compressing molding, melt molding, transfer molding, injection molding, or a combination thereof. The body may be free of any post forming steps. The body may be free of any sanding, spraying, smoothing, surface treatment, or a combination thereof. The body directly from forming may be moved to coating. The coating may be applied directly on the body. One or more masks may be applied to the body before the coating is applied so that one or more areas may be free of the coating. The body may be free of a base coat. The process may have a reduced cycle time relative to a material that is free of thermally conductive materials. The process time of molding may be accelerated relative to molding a material without thermally conductive materials. The cycle time for each body may be about three minutes or less, about 2.5 minutes or less, about 2 minutes or less, about 1.5 minutes or less, about 1 minute or less, or about 30 seconds or less. The thermally conductive materials may transfer heat out of the body so that the heat transfers into the ambient and the bodies may be produces with less cycle time. The cycle time may be reduced by about 10 seconds or more, 20 seconds or more, 30 seconds or more, or even about 40 seconds or more.

FIG. 1 illustrates a side view of a vehicle 2 including light systems 10. The light systems 10 provide light around the vehicle 2. The light systems 10 are located at a fore 4 end of the vehicle 2 but could be located at an aft 6 of the vehicle 2. The light systems 10 include a body 12. The light systems 10 may be controlled by one or more controllers 8 jointly or individually.

Figure 2A:
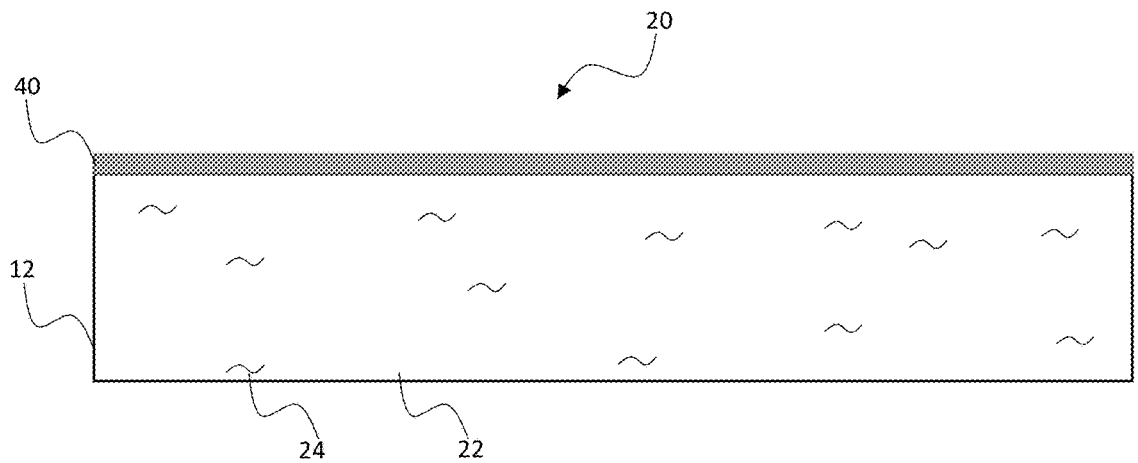
FIG. 2A is a cross-sectional view of a body.

FIG. 2A is a cross sectional view of a body 12 so that the components within the body 12 are visible. The body 12 has a body composition 20. The body composition 20 has a bulk molded compound (BCM) 22 including thermally conductive material 24 with a coating 40 on the body 12 and the body composition 20.

Figure 2B:
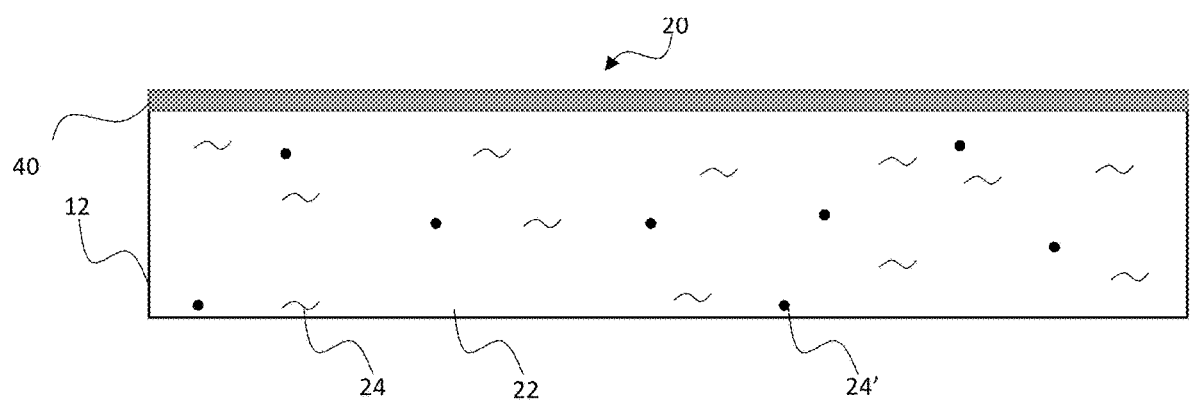
FIG. 2B is a cross-sectional view of a body having a different composition than the body of FIG. 2A.

FIG. 2B is a cross sectional view of a body 12 so that the components within the body 12 are visible. The body 12 has a body composition 20. The body composition 20 has a bulk molded compound (BCM) 22 including thermally conductive materials 24 and 24' with a coating 40 on the body 12 and the body composition 20. The thermally conductive material 24 is different than the thermally conductive material 24'.

Figure 2C:
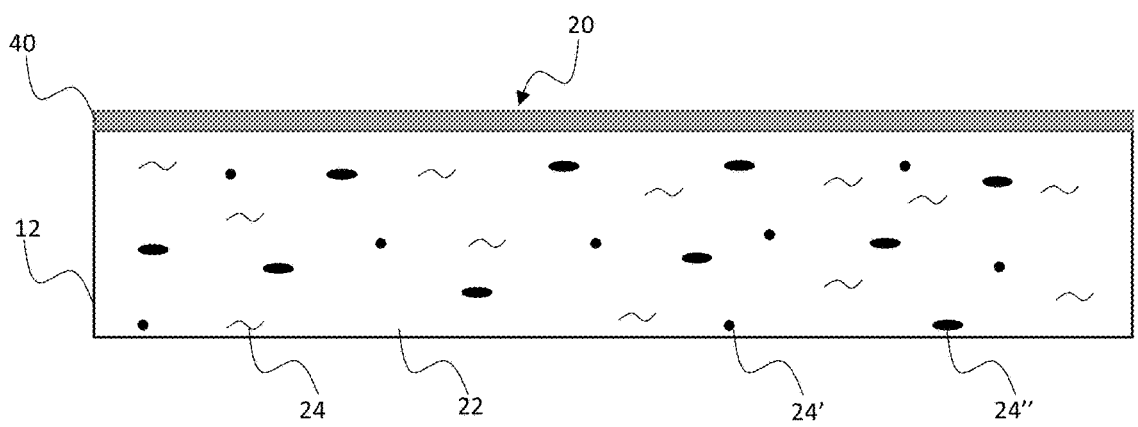
FIG. 2C is a cross-sectional view of a body having a different composition than the body of FIGS. 2A-2B.

FIG. 2C is a cross sectional view of a body 12 so that the components within the body 12 are visible. The body 12 has a body composition 20. The body composition 20 has a bulk molded compound (BCM) 22 including thermally conductive materials 24, 24', and 24'' with a coating 40 on the body 12 and the body composition 20. The thermally conductive material 24 is different than the thermally conductive materials 24' and 24''. The thermally conductive material 24' and 24'' are both different. The differences between the thermally conductive materials 24, 24', and 24'' may be type of material, size of material, length of material, amount of material, or a combination thereof.

Figure 3:
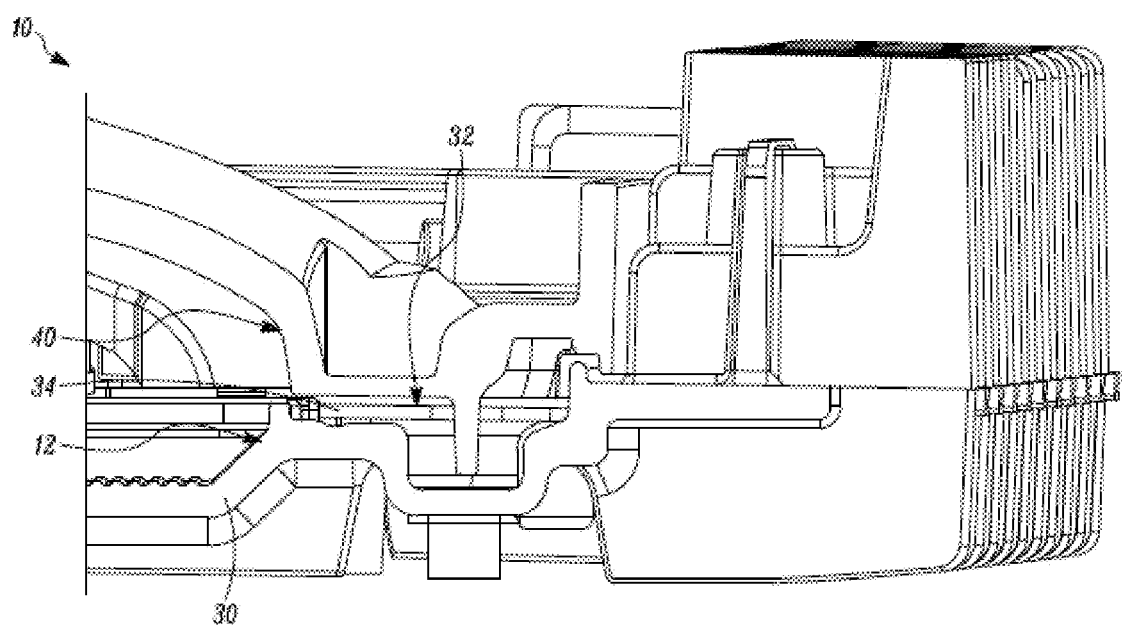
FIG. 3 is a cross-sectional view of a light system.

FIG. 3 is a cross-sectional view of a light system 10. The light system 10 includes a body 12 with a coating 40 on the body. The coating 40 assists in transferring heat into the thermally conductive material (not shown) in the body 12 and to direct light to a location of interest. The body 12 as shown is a lighting component 30, which as shown is a reflector. A heat producing component 32 is in direct contact with the coating 40 of the body 12 so that heat is removed from the heat producing component 32 and dissipated through the body 12. The heat producing component 32 as shown is a printed circuit board 34. The printed circuit board 34 or components on the printed circuit board 34 produce heat and the heat is dissipated through the coating 40 and the body 12.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A body composition comprising:
    a bulk molded compound (BMC) comprising:
        one or more thermoset resins;
        one or more fillers;
        one or more reinforcements; and
        one or more binders;
    a thermally conductive material disposed within the bulk molded compound so that when the body composition is molded into a body, the body assists is removing thermal energy, wherein the thermally conductive material is present in an amount of about 5 percent or more and about 15 percent or less of the total weight of the body composition.

2. The body composition of claim 1, wherein body composition has a thermal conductivity of about 15 W/mK or more.

3. The body composition of claim 1, wherein the thermally conductive material is or includes graphite, graphene, fullerene, copper, bronze, silver, gold, nickel, iron, steel, boron nitride, aluminum, or a combination thereof.

4. The body composition of claim 3, wherein the thermally conductive material is or includes fibers, particles, nano-tubes, flakes, crystals, natural, synthetic, or a combination thereof.

5. The body composition of claim 1, wherein one or more fillers are talcum powder.

6. The body composition of claim 1, wherein the reinforcement is chopped glass fibers and crushed glass and the reinforcement is present in an amount from about 5 percent or more to about 30 percent or less by weight of the total weight of the BMC.

7. The body composition of claim 1, wherein the body is directly coated with a coating the reflects light away from the body and the coating.

8. A lighting component comprising:
    a body comprising:
        a body composition comprising:
            a bulk molded compound (BMC);
            a thermally conductive material in the bulk molded compound;
        a coating located directly on the body so that the coating connects directly to the body;
    a heat producing component in communication with the body, wherein heat from the heat producing component is absorbed into the body and some or all of the heat is dissipated by the body, wherein the thermally conductive material is present in an amount of about 5 percent or more and about 15 percent or less of the total weight of the body composition.

9. The lighting component of claim 8, wherein the heat producing component is a printed circuit board, a microprocessor, or both.

10. The lighting component of claim 8, wherein the thermally conductive material is or includes graphite, graphene, fullerene, copper, bronze, silver, gold, nickel, iron, steel, boron nitride, aluminum, or a combination thereof.

11. The lighting component of claim 8, wherein the thermally conductive material is or includes fibers, particles, nano-tubes, flakes, crystals, natural, synthetic, or a combination thereof.

12. The lighting component of claim 10, wherein the body composition is free of a base coat between the body composition and the coating.

13. The lighting component of claim 12, wherein the bulk molded compound comprises one or more fillers and the one or more fillers comprise clay, talc, alumina trihydrate, or a combination thereof.

14. The lighting component of claim 13, wherein the one or more fillers are present in an amount from about 40 percent to about 70 percent by weight of the BMC.

15. The lighting component of claim 8, wherein the BMC comprises:
    one or more thermoset resins;
    one or more reinforcements; and
    one or more binders.

16. The lighting component of claim 10, wherein the body composition has a thermal conductivity of about 15 W/mK or more.

17. A process comprising:
    forming a bulk molded compound (BMC) comprising:
        one or more thermoset resins;
        one or more fillers;
        one or more reinforcements; and
        one or more binders;
    combining the bulk molded compound with a thermally conductive material to form a body composition;
    molding the body composition into a body of a lighting component; and
    applying a coating directly over the body; and
    wherein a cycle time of molding the body composition into a body is reduced by between about 10 second and two minutes relative to a BMC that is free of the thermally conductive material.

18. The process of claim 17, wherein the body composition has a thermal conductivity of about 15 W/mK or more.

19. The process of claim 18, wherein the body composition is free of a base coat between the body composition and the coating.

20. The lighting component of claim 8, further comprising:
    a thermoplastic resin comprising:
        a polycarbonate, acetal copolymer polyoxymethylene, acetal homopolymer polyoxymethylene, acrylic, acrylic-polymethyl methacrylate (PMMA), nylon, polyethylene, polypropylene, polystyrene, polyvinyl chloride (PVC), polytetrafluoroethylene, polyvinyl acetate, saturated polyesters, or a combination thereof; and
    a mold release agent.

* * * * *